United States Patent [19]

Pickering et al.

[11] 4,415,070
[45] Nov. 15, 1983

[54] HOSE CONNECTOR

[75] Inventors: John F. Pickering, Rugby, England; David Evans, Queenswood, South Africa

[73] Assignee: Lucas Industries Limited, Birmingham, England

[21] Appl. No.: 268,240

[22] Filed: May 29, 1981

[30] Foreign Application Priority Data

Jun. 4, 1980 [GB] United Kingdom ................ 8018244

[51] Int. Cl.³ .............................................. F16D 65/78
[52] U.S. Cl. ................................ 188/264 F; 188/71.6; 285/41
[58] Field of Search ................... 285/41, 187; 137/338; 188/264 F, 71.6, 264 R; 303/85

[56] References Cited

U.S. PATENT DOCUMENTS

| 1,951,948 | 3/1934 | Pobjoy .............................. 285/41 |
| 2,821,272 | 1/1958 | Sanford et al. ................. 188/264 F |

FOREIGN PATENT DOCUMENTS

| 677208 | 12/1963 | Canada .......................... 188/264 F |
| 1001791 | 10/1951 | France ........................... 188/264 F |

Primary Examiner—Dave W. Arola
Attorney, Agent, or Firm—Holman & Stern

[57] ABSTRACT

A hose connector has a body having a first portion adapted to receive a flexible hydraulic hose and a second portion adatped for connection to a brake actuator. A bore portion of the second body portion is arranged to provide a space large enough to contain at least a major part of any heated brake fluid returning from the actuator upon brake retraction thereby minimizing the amount of heated fluid reaching the hose.

7 Claims, 1 Drawing Figure

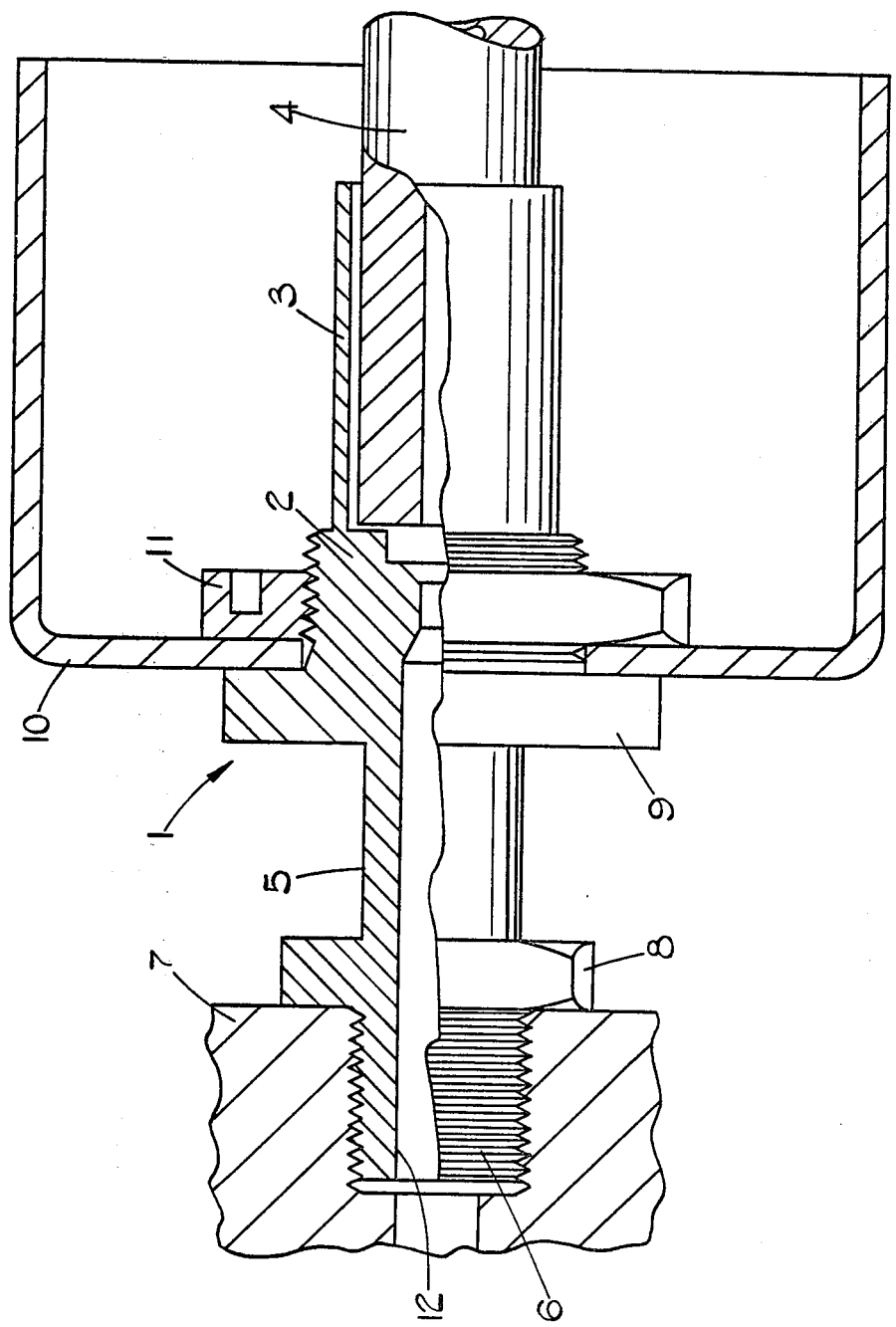

HOSE CONNECTOR

BACKGROUND OF THE INVENTION

1. Field of the Invention

This invention relates to a hose connector primarily for use in connecting a hydraulic fluid supply hose to a vehicle brake actuator, such as a disc brake caliper.

2. Description of the Prior Art

Weight reduction is becoming an increasingly important factor in the design of brake calipers and, for this reason, attention is turning to the manufacture of calipers from aluminium. In addition, modern brake friction materials are tending to include larger proportions of metal than hitherto. Both of these designs tend to lead to an increase in the amount of heat conducted from the braking surface of the brake disc through the brake pad assembly and caliper body into the brake fluid, and this can, in turn, have a deleterious effect on the material, usually rubber, of the caliper fluid supply hose.

BRIEF SUMMARY OF THE INVENTION

An object of the present invention is to provide a hose connector which acts to reduce the amount of heat transmitted from a brake actuator, such as a disc brake caliper, to a hydraulic supply hose connected thereto.

According to the invention, a hose connector comprises a body having a first portion adapted for the securing thereto of a flexible hydraulic fluid supply hose in fluid communication with a through bore of the body, and a second portion adapted for securing in fluid-tight manner to a brake actuator, a portion of the bore of the second body portion forming a collector of sufficient volume to contain at least a major part of any heated brake fluid expelled, in use, from the actuator during brake retraction, whereby the amount of such fluid reaching the hose is minimized.

In one preferred arrangement, the wall of said collector may be provided with, or be in heat transfer relationship with, means arranged to increase the heat dissipation capability of said wall. Such means may conveniently be in the form of a fin projecting from the exterior surface of the body.

BRIEF DESCRIPTION OF THE DRAWINGS

The invention will now be described, by way of example, with reference to the accompanying drawing which is a longitudinal cross-section of one form of the hose connector of the invention.

DETAILED DESCRIPTION

Referring to the drawing, the hose connector shown therein comprises a body indicated generally by the numeral 1, the body having a boss 2 from which projects a first body portion in the form of a tubular extension 3 adapted to receive a standard flexible hydraulic supply hose 4, crimped therein in conventional manner.

A second body portion in the form of a tubular extension 5 projects from the boss 2 in the opposite direction to the extension 3 and has an externally threaded end portion 6 permitting connection of the body to a brake caliper 7 by way of a correspondingly threaded opening in the latter. A flange 8 integral with the body is formed externally as a nut to facilitate tightening of the connector into the caliper. The body 1 has a further flange 9 spaced from the flange 8 and this provides a retaining abutment for a generally cup-shaped fin 10, the base of which is located on the boss 2, the fin being secured in position by a nut 11 screwed onto the threaded external surface of the boss.

The body 1 has a through bore 12 permitting the supply of hydraulic fluid from the hose 4 to the brake caliper 7. When the caliper is operated to apply the brake, brake fluid passes into the caliper actuating cylinder and becomes heated by conduction of heat through the pad assemblies and caliper body. In the case of an aluminum caliper fitted with pads having a relatively high metal content, heat transmission into the fluid can raise the fluid temperature to such an extent that contact of the hot fluid with the hose 4 can have an undesirable effect on the hose material, leading to deterioration of the hose and possible danger.

In order to alleviate this problem, the extension 5 of the body is arranged to form a space of sufficient volume to ensure that at least a major part, and preferably all, of the heated brake fluid returning from the caliper upon pad retraction is contained within the space and does not therefore pass into the hose 4. In the embodiment illustrated, the space has been created by making the bore 12 of diameter larger than the standard 3 mm used in conventional connectors, the bore 12 in the present embodiment being typically increased to 5 mm. By using a standard external dimension for the extension 5, the wall of this extension becomes relatively thin and thus encourages rapid dissipation of heat outwardly therethrough. Heat also flows along the wall of the extension 5 and into the flange 9 from which it is rapidly absorbed by the fin 10 and radiated to the surrounding atmosphere. It will thus be appreciated that considerable cooling is effected of the fluid in the extension 5, so that any of that fluid which reaches the hose is not so hot as to have an untoward effect thereon. In practice, it is found that, by using the hose connector of the invention, not only is the hose maintained in acceptably cool condition during braking by the caliper, but increased cooling of the caliper can also occur.

Although it is preferred to create the space within the extension 5 by an increase in bore diameter, as described above, it would be possible to do this by increasing the length of the extension 5, or by a combination of both of these expedients. Heat dissipation from the connector may be achieved by the use of any conveniently shaped fins or other devices formed integrally with or secured to the connector. When a separately made fin is used, it may be made of material, usually metal, different from the metal of the body 1.

I claim:

1. A hose connector for a hydraulic brake comprising a connector body having a first portion connectable to a flexible hydraulic fluid supply hose and a second portion, connectable to a brake actuator, a bore extending through the body and said first and second portions, means to secure said hose to said first portion in fluid communication with said bore and means to secure said second portion to said brake actuator in fluid tight relationship therewith so that hydraulic fluid flows in said bore in one direction towards said actuator when the brake is applied and in the opposite direction in said bore when the brake is retracted, and means for minimizing the amount of heat from the brake reaching said hose comprising a collector in at least a portion of said bore extending through said second body portion having a predetermined volume in relation to the brake actuator sufficient to contain at least a major part of the heated fluid expelled from the actuator during retraction of the brake.

2. A hose connector as claimed in claim 1 wherein said collector comprises, the bore in said second portion of the connector body is substantially larger in diameter than the bore extending through the connector body and the interior diameter of the flexible hose.

3. A hose connector according to claim 1 wherein said connector body has a substantially central boss, and said first and second body portions extend respectively in opposite directions from said boss.

4. A hose connector according to claim 1 or claim 2, wherein said collector has a wall and said means for minimizing heat to the hose further comprises heat dissipating means in heat transfer relationship with the wall of the collector to increase the heat dissipation capability of the wall.

5. A hose connector according to claim 3, wherein said heat dissipating means comprises a fin projecting from the exterior surface of the body.

6. 6. A hose connector according to claim 4, wherein said fin is a separately made component secured to said connector body.

7. A hose connector according to claim 5 wherein said connector body has a radially projecting flange adjacent said boss, said boss has a screw thread thereon and said heat dissipating fin is clamped against said flange by a clamping nut threadedly engaged on the boss.

* * * * *